Figure 1:
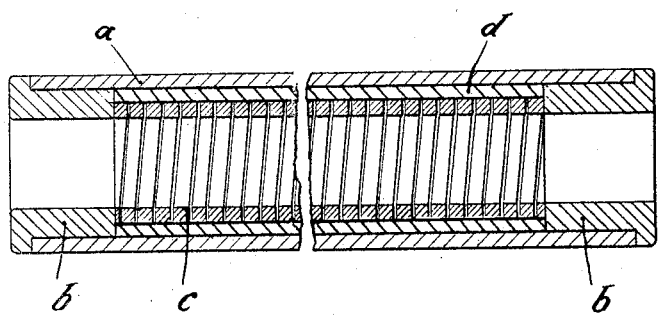

Dec. 20, 1932.  K. TESSKY  1,891,290

WORK PIECE GUIDE FOR MACHINE TOOLS

Filed Aug. 13, 1930

Inventor:
Karl Tessky
by Karlwicha
atty.

Patented Dec. 20, 1932

1,891,290

UNITED STATES PATENT OFFICE

KARL TESSKY, OF ESSLINGEN-ON-THE-NECKAR, GERMANY

WORK PIECE GUIDE FOR MACHINE TOOLS

Application filed August 13, 1930, Serial No. 474,949, and in Germany August 24, 1929.

My invention refers to workpiece guides and more especially to means for guiding bar-shaped workpieces to feed machine tools. It has particular reference to tubular guides, in which the bar-shaped blank or workpiece is kept in rapid rotation and one of its objects is to provide means whereby shocks, wear and injury to the tubular guide as well as to the workpiece or blank and the noise resulting from such shocks are effectively avoided.

According to the present invention I provide the tubular guide with a special lining which is resistive to wear and injury and also shock absorbing and sound deadening buffer means.

In the drawing affixed to this specification and forming part thereof two modifications of a workpiece guide embodying my invention are illustrated diagrammatically by way of example.

Fig. 1 is an axial section of one and

Figure 2:
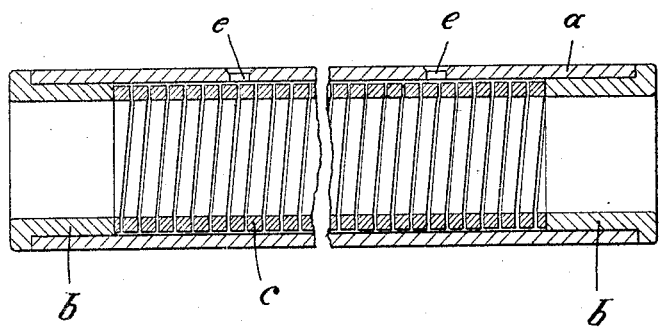

Fig. 2 a similar view of the second modification.

Referring first to Fig. 1, $a$ is the stationary metallic guide tube and $b$, $b$ are two end caps secured in the ends of the tube. Intermediate between the two caps a coil spring $c$ is inserted in the tube, this spring being wound of square wire, preferably in such manner, that the windings are not in contact with each other. Spring $c$ is surrounded by a spun, wound or hose-like envelop $d$, which may consist for instance of rubber, hemp, cotton, asbestos, wire, ribbon or some other resilient and sound deadening material. This envelop is made strong enough to apply itself to the inner wall of the tube $a$ when the spring $c$ is inserted.

The shocks and concussions caused by the blank or workpiece rapidly rotating within the spring $c$ are first taken up and damped by the spring $c$ which while being resilient, is resistive to wear. The similarly resistive envelop $d$ prevents these shocks or concussions from being transmitted onto the tube $a$, whereby injury to this tube and transmission of the noise to the outside are effectively prevented.

In the modification shown in Fig. 2 the outer diameter of the coil spring $c$ is such that there is only little play between the spring and the inner wall of tube $a$. Through lubricating holes $e$ or the like a suitable lubricant, for instance oil, is introduced into the tube $a$, the lubricant filling the interstices between the coil windings and more especially the gap between the spring and the inner wall of the tube, so that the spring is floatingly supported in the tube by the oil layer, similarly as a rotating shaft is supported in its bearings. The spring and oil thus exert a buffer action whereby both noise and shocks are deadened.

Small quantities of lubricant have proved sufficient for obtaining this result, for the capillary action as well as the continuous movements of the spring, which is loosely inserted in the tube $a$ and is slowly carried along by the rapidly rotating bar, provide for a permanent distribution of oil.

Obviously my invention is not limited to coil springs made of square wire.

I wish it to be understood that I do not desire to be limited to the exact details of construction shown and described for obvious modifications will occur to a person skilled in the art.

In the claims affixed to this specification no selection of any particular modification of the invention is intended to the exclusion of other modifications thereof and the right to subsequently make claim to any modification not covered by these claims is expressly reserved.

I claim:—

1. Stationary work-piece guide for rotating blanks fed to machine tools comprising a guide tube, a wire coil lining said tube and a shock absorbing means inserted between said tube and said coil.

2. Stationary work-piece guide for rotating blanks fed to machine tools comprising a guide tube, a coil spring lining said tube and a shock absorbing means inserted between said tube and said coil.

3. Stationary work-piece guide for rotating blanks fed to machine tools comprising a guide tube, a wire coil lining said tube and a shock absorbing envelop inserted between said tube and said coil.

4. Stationary work-piece guide for rotating blanks fed to machine tools comprising a guide tube, a wire coil lining said tube and a shock absorbing hose-like envelop inserted between said tube and said coil.

5. Stationary work-piece guide for rotating blanks fed to machine tools comprising a guide tube, and a wire coil lining said tube, said wire coil and said tube defining a space for receiving a shock-absorbing liquid.

6. Stationary work-piece guide for rotating blanks fed to machine tools comprising a guide tube, and a wire coil lining said tube, said wire coil and said tube defining a space for receiving a shock-absorbing lubricant.

In testimony whereof I affix my signature.

KARL TESSKY.